(12) United States Patent
Franz et al.

(10) Patent No.: US 7,688,451 B2
(45) Date of Patent: Mar. 30, 2010

(54) HETERODYNE INTERFEROMETER HAVING AN OPTICAL MODULATOR

(75) Inventors: Stefan Franz, Jena (DE); Matthias Fleischer, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 11/652,979

(22) Filed: Jan. 11, 2007

(65) Prior Publication Data
US 2007/0247632 A1 Oct. 25, 2007

(30) Foreign Application Priority Data
Jan. 13, 2006 (DE) .................... 10 2006 001 731

(51) Int. Cl.
*G01B 9/02* (2006.01)
(52) U.S. Cl. .................................................. 356/485
(58) Field of Classification Search ............. 356/484, 356/485, 489
See application file for complete search history.

(56) References Cited

U.S. PATENT DOCUMENTS

| | | | | |
|---|---|---|---|---|
| 3,953,128 A | * | 4/1976 | Holly | 356/485 |
| 4,820,047 A | * | 4/1989 | Snyder | 356/484 |
| 5,133,600 A | * | 7/1992 | Schroder | 356/460 |
| 5,416,582 A | * | 5/1995 | Knutson et al. | 356/484 |
| 5,883,714 A | * | 3/1999 | Jann et al. | 356/484 |
| 6,015,969 A | * | 1/2000 | Nathel et al. | 250/227.27 |
| 6,037,579 A | * | 3/2000 | Chan et al. | 250/216 |
| 6,580,513 B2 | * | 6/2003 | Akahoshi | 356/484 |
| 6,714,306 B1 | * | 3/2004 | Chovan et al. | 356/484 |
| 6,873,405 B2 | * | 3/2005 | Kido et al. | 356/121 |
| 7,193,720 B2 | * | 3/2007 | Gatt | 356/489 |
| 7,426,038 B2 | * | 9/2008 | Ogawa | 356/484 |
| 7,545,503 B2 | * | 6/2009 | Aiyer | 356/485 |
| 7,609,385 B2 | * | 10/2009 | Dorrer | 356/484 |
| 2003/0067607 A1 | * | 4/2003 | Wolleschensky et al. | 356/484 |
| 2004/0156053 A1 | * | 8/2004 | Wolleschensky et al. | 356/485 |
| 2006/0061770 A1 | * | 3/2006 | Erskine | 356/484 |

* cited by examiner

*Primary Examiner*—Gregory J Toatley, Jr.
*Assistant Examiner*—Scott M Richey
(74) *Attorney, Agent, or Firm*—Kenyon & Kenyon LLP

(57) ABSTRACT

A heterodyne interferometer having two interferometer arms and one optical modulator for changing the frequency of a radiation conducted via one interferometer arm and having a control device for setting the frequency change of the radiation and a detector device for analyzing the interfered output radiation. The amplitude of an input beam conducted into the heterodyne interferometer is modulated using a frequency which is different from the frequency change of the radiation in the optical modulator prior to being split between the interferometer arms. A heterodyne frequency corresponding to the difference of the frequency change of the radiation and the frequency of the amplitude modulation of the radiation may be achieved.

8 Claims, 2 Drawing Sheets

HETERODYNE INTERFEROMETER HAVING AN OPTICAL MODULATOR

FIELD OF THE INVENTION

The present invention relates to a heterodyne interferometer having two interferometer arms and one optical modulator for changing the frequency of the radiation conducted via one interferometer arm and having a control device for setting the frequency change of the radiation and a detector device for analyzing the interfered output radiation.

BACKGROUND INFORMATION

In heterodyne interferometers, coherent radiation components having slightly different frequencies overlap. A signal having the difference frequency of the two radiation components, known as heterodyne frequency, is then obtained at the detector device. The information, for example, about the shape or roughness of surfaces, is contained in the phase angle of the detected frequency.

Coherent radiation components are obtained by using a shared light source, whose radiation is split into two partial beams with the aid of a beam splitter, for example. Changing the frequency in at least one partial beam using acousto-optical modulators is performed for obtaining different radiation frequencies in the two partial beams. A frequency shift in the range of a few tens of MHz, typically on the order of 35 MHz, depending on the selected control frequency, is then achieved using an acousto-optical modulator. If an acousto-optical modulator is provided for only one partial beam, the control frequency corresponds to the heterodyne frequency obtained at the detector device. This is the reason for one disadvantage of this design, because for the same frequencies of the electrical control for the acousto-optical modulator and the analysis in the detector device, interference with the useful signal in the detector by the control signal of the modulator is difficult to prevent. The high analysis frequency represents another disadvantage. Such high frequencies require a relatively high degree of complexity to minimize crosstalk, noise, and reflections.

It is therefore advantageous to provide one acousto-optical modulator having a slightly different control frequency for each partial beam. The heterodyne frequency is given by the difference between the control frequencies and may be specified accordingly. Therefore the analysis frequency of the detector device is different from the control frequencies of the acousto-optical modulators, whereby interference with the detector signals may be largely avoided. At the same time, a relatively low heterodyne frequency results, mostly on the order of a few hundreds of kHz, which makes simple analysis of the phase difference possible for calculating the surface geometry to be measured. The disadvantage of this design is that two acousto-optical modulators must be provided, which results in increased costs.

Heterodyne interferometers may be designed as a Mach-Zehnder system or as a Michelson interferometer. The Mach-Zehnder system offers the advantage that a partial beam passes through the acousto-optical modulator(s) only once. In the case of a Michelson interferometer, the partial beam passes through the acousto-optical modulator twice. This makes it more difficult to influence the partial beam using the acousto-optical modulator.

SUMMARY

An object of the present invention is to provide a heterodyne interferometer which makes low-interference analysis of the interference signals possible while having a cost-effective design.

This object of the present invention may be achieved by modulating the amplitude of an input beam injected into the heterodyne interferometer prior to the beam being split between the interferometer arms using a frequency which is different from the frequency change of the radiation in the optical modulator. The heterodyne frequency is now obtained from the combination of the control frequency for the frequency modulation in the optical modulator and the frequency of the amplitude modulation of the input radiation. It may be selected in such a way that it is different from the control frequencies for the frequency modulation or the amplitude modulation. Interference with the analysis by crosstalk of the control signals at the detector device is thus avoided. The same advantages result as in the case of a design having two optical modulators in both interferometer arms; however, since this design uses only one optical modulator, this results in a considerable cost advantage in the manufacture of the heterodyne interferometer.

In a preferred example embodiment of the present invention, the amplitude of the input beam is modulated sinusoidally or in the shape of square pulses. The interference contrast achieved in this way is a function of the selected shape of amplitude modulation. The interference contrast may be increased up to twofold by modulation in the form of narrow square pulses. The loss of intensity of the measuring signal, which is to be observed initially compared to a design having two acousto-optical modulators, may thus be compensated for. The amplitude of the input signal may be modulated by providing a chopper or a radiation source of modulatable intensity. The frequency of the amplitude modulation may be predefined via the rotational speed of the chopper or the control frequency of the radiation source. The use of a chopper has the advantages that the radiation source may be operated continuously with constant radiation characteristics and radiation sources not having modulatable intensity themselves may be used. In contrast, the intensity of the radiation source itself may be modulated without movable and therefore failure-prone and maintenance-intensive components. In particular, radiation sources based on diode lasers or SLEDs are suitable for this purpose. Here the modulation input is often already available or may be retrofitted cost-effectively.

A heterodyne frequency that is properly isolatable from interference by crosstalk of the control signals for amplitude modulation and frequency modulation may be achieved by designing the detector device for measuring at a heterodyne frequency corresponding to the sum of or the difference between the frequency change of the radiation in the optical modulator and the frequency for modulating the amplitude of the input beam. Measurement at a heterodyne frequency formed from the sum of the frequencies requires narrow-band detection in the detector device. Measurement at a frequency formed by the difference is simpler in principle because at these lower frequencies the phase difference may be electronically analyzed more easily. However, both heterodyne frequencies are sufficiently far away from the two control frequencies of the optical modulator and for amplitude modulation of the input beam.

In another example embodiment of the present invention, the heterodyne frequency is formed from the frequency change of the radiation in the optical modulator, the frequency for modulating the amplitude of the input beam, and an electronic admixture in the detector device. The frequency of the amplitude modulation and the frequency of the electronic admixture in the detector device form the equivalent of the previously described frequency for amplitude modulation in the heterodyne interferometer according to the present invention without electronic admixture in the detector device. The heterodyne frequency results from the difference between the frequency change in the optical modulator and the sum of the frequencies of the amplitude modulation and the frequency of the admixture in the detector device.

A simple frequency change of the radiation which is easy to adjust via suitable control may be achieved by providing an acousto-optical modulator as the optical modulator.

A more accurate measurement design results by designing the heterodyne interferometer as a Mach-Zehnder system or as a Michelson interferometer. Compared to the Michelson interferometer, the Mach-Zehnder interferometer offers the advantage that the partial beam passes through the optical modulator only once. In a Michelson interferometer, the partial beam passes through the optical modulator twice, which makes influencing the partial beam more difficult.

BRIEF DESCRIPTION OF THE DRAWINGS

The present invention is explained below with reference to the exemplary embodiments depicted in the figures.

DESCRIPTION OF EXAMPLE EMBODIMENTS

Figure 1:
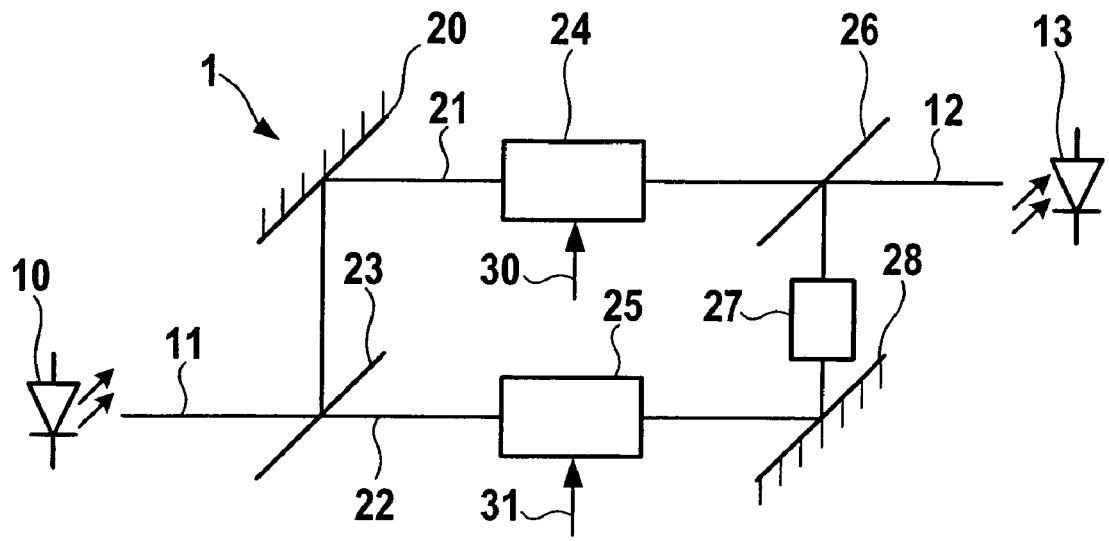
FIG. 1 schematically shows a heterodyne interferometer having two acousto-optical modulators according to the related art.

FIG. 1 schematically shows a heterodyne interferometer 1 having two acousto-optical modulators 24, 25 according to the related art in the Mach-Zehnder system. An input beam 11 arrives from a radiation source 10 at a beam splitter 23. Beam splitter 23 splits input beam 11 into two partial beams which are conducted in two interferometer arms 21, 22. In one interferometer arm 21, the partial beam is supplied to an acousto-optical modulator 24 via a deflecting mirror 20 and from there to another beam splitter 26. In second interferometer arm 22, the partial beam is supplied from beam splitter 23 to acousto-optical modulator 25 and from there to beam splitter 26 via a deflecting mirror 28. In beam splitter 26, the partial beams from both interferometer arms 21, 22 are superimposed. In a unit, symbolically represented as phase shift 27, between deflecting mirror 28 and beam splitter 26, the partial beam conducted in interferometer arm 22 undergoes a phase shift $\Delta\phi$ which is a function of the path signal. Interfered output radiation 12 is supplied from beam splitter 26 to detector device 13.

Acousto-optical modulators 24, 25 are controlled by control signals 30, 31. Acousto-optical modulator 24 causes a frequency shift $f_1$ of the partial beam conducted in interferometer arm 21 according to control frequency $f_1$ of control signal 30. Second acousto-optical modulator 25 causes a frequency shift $f_2$ of the partial beam conducted in interferometer arm 22 according to control frequency $f_2$ of control signal 31. Control frequencies $f_1$ and $f_2$ define the heterodyne frequency of interfered output radiation 12. The variation over time of intensity I of the radiation detected in detector device 13 may be represented by the equation $$I=U_1^2+U_2^2+2U_1U_2\cos(2\pi(f_1-f_2)t-\Delta\phi),$$

where $U_1$ and $U_2$ correspond to the amplitudes of the two partial beams, while t symbolizes the time. A signal of frequency $f_1-f_2$ and phase $\Delta\phi$ is then impressed on the intensity of the radiation, which is electronically detected. Heterodyne frequency $f_1-f_2$ substantially differs from control frequencies $f_1$ and $f_2$ of acousto-optical modulators 24, 25, which makes interference-free analysis in detector device 13 possible.

Figure 2:
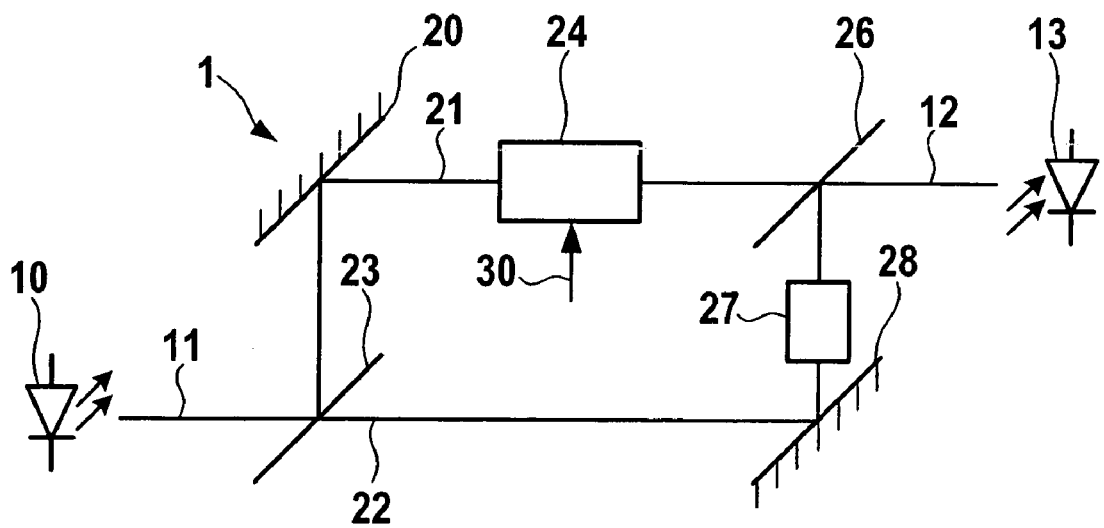
FIG. 2 schematically shows a heterodyne interferometer having one acousto-optical modulator according to the related art.

FIG. 2 schematically shows a heterodyne interferometer 1 having a single acousto-optical modulator 24 according to the related art in the Mach-Zehnder system. The design generally corresponds to that of FIG. 1 having the components whose function has been described previously. In contrast to the embodiment depicted in FIG. 1, no acousto-optical modulator is provided in interferometer arm 22, so that no frequency shift occurs for the partial beam conducted in interferometer arm 22. The variation over time of intensity I of the radiation detected in detector device 13 may be represented by the equation:

$$I=U_1^2+U_2^2+2U_1U_2\cos(2\pi f_1 t-\Delta\phi).$$

The heterodyne frequency in detector device 13 thus corresponds to frequency $f_1$ of control signal 30 applied to acousto-optical modulator 24. The analysis in detector device 13 must be performed at control frequency $f_1$ of acousto-optical modulator 24, which results in difficult-to-handle interference due to crosstalk of the electrical signals.

Figure 3:
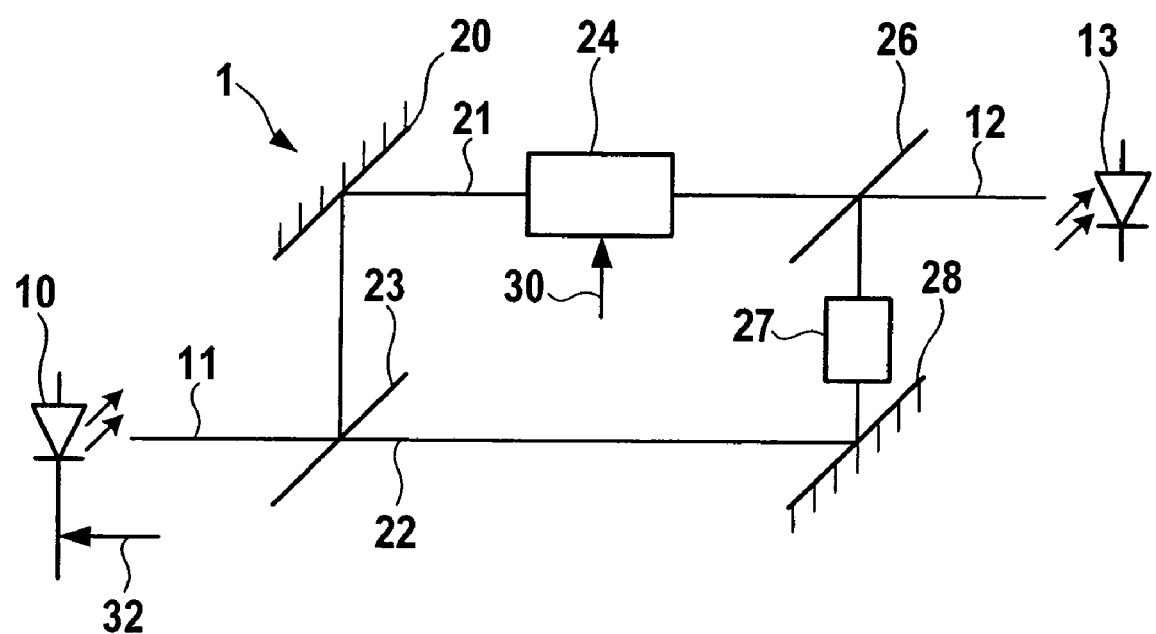
FIG. 3 shows an example embodiment of a heterodyne interferometer according to the present invention having a light source of modulatable intensity.

FIG. 3 shows an example embodiment of a heterodyne interferometer 1 according to the present invention having a light source 10 of modulatable intensity, also in the Mach-Zehnder system. The design generally corresponds to that depicted in FIG. 2. Unlike the specific embodiment depicted in FIG. 2, radiation source 10 receives a control signal 32 to modulate the intensity of radiation source 10 according to a frequency $f_2$. This results in a variation over time of the intensity of the radiation detected in detector device 13 according to the equation $$I=(U_1^2+U_2^2+2U_1U_2\cos(2\pi f_1 t-\Delta\phi))(0.5+0.5\cos(2\pi f_2 t)),$$

whence:

$$I = 0.5U_1^2 + 0.5U_2^2 + U_1U_2\cos(2\pi f_1 t - \Delta\varphi) +$$
$$0.5(U_1^2 + U_2^2)\cos(2\pi f_2 t) + 0.5U_1U_2\cos(2\pi(f_1 + f_2)t -$$
$$\Delta\varphi) + 0.5U_1U_2\cos(2\pi(f_1 - f_2)t - \Delta\varphi)$$

If detector device 13 is designed for analyzing low-frequency signals, the high-frequency components $f_1$, $f_2$ and $f_1+f_2$ do not enter the analysis. Therefore, the variation of intensity is taken into account in the analysis according to $$I=0.5U_1^2+0.5U_2^2+0.5U_1U_2\cos(2\pi(f_1-f_2)t-\Delta\phi)$$

at heterodyne frequency $f_1-f_2$, which corresponds in time to the variation in intensity of the system depicted in FIG. 1 having two acousto-optical modulators. The lower intensity of output radiation 12 compared to the design having two acousto-optical modulators may be compensated for by a suitable choice of control signal 32. The interference contrast may thus be increased twofold again if narrow square pulses are provided as control signal 32.

If detector device 13 is designed for analyzing at the frequency $f_1+f_2$, the intensity curve may be analyzed according to the equation $$I=0.5U_1^2+0.5U_2^2+0.5U_1U_2\cos(2\pi(f_1+f_2)t-\Delta\phi).$$

Frequency $f_1+f_2$ is also far from control frequencies $f_1$ and $f_2$, so that crosstalk of the control frequencies over the measuring signal may be avoided. The precondition for an analysis at frequency $f_1+f_2$ is that detector device 13 should have a narrow-band design.

In a further specific embodiment, part of frequency $f_2$ may be electronically admixed in detector device 13. In this case the intensity of radiation source 10 is modulated according to a frequency corresponding, for example, to 90% of frequency $f_2$. The remaining 10% to frequency $f_2$ is admixed in detection device 13.

What is claimed is:

1. A heterodyne interferometer, comprising:
   two interferometer arms;
   an optical modulator adapted to change a frequency of radiation conducted via one of the interferometer arms;
   a control device adapted to adjust the frequency change of the radiation;
   a detector device configured to analyze an interfered output radiation; and
   an amplitude modulator connected to a radiation source and configured to modulate an amplitude of an input beam conducted into the heterodyne interferometer, prior to the input beam being split between the interferometer arms, using a frequency which is different from the frequency change of the radiation in the optical modulator.

2. The heterodyne interferometer as recited in claim 1, wherein the amplitude of the input beam is modulated one of sinusoidally or in a shape of square pulses.

3. The heterodyne interferometer as recited in claim 1, wherein the amplitude modulator is one of a chopper or a radiation source of modulatable intensity.

4. The heterodyne interferometer as recited in claim 1, wherein the detector device is adapted to measure at a heterodyne frequency corresponding to the sum of or difference between the frequency change of the radiation in the optical modulator and the frequency for modulating the amplitude of the input beam.

5. The heterodyne interferometer as recited in claim 4, wherein a heterodyne frequency is formed from the frequency change of the radiation in the optical modulator, the frequency for modulating the amplitude of the input beam, and an electronic admixture in the detector device.

6. The heterodyne interferometer as recited in claim 1, wherein the optical modulator is an acousto-optical modulator.

7. The heterodyne interferometer as recited in claim 1, wherein the heterodyne interferometer is one of a Mach-Zehnder system or a Michelson interferometer.

8. A heterodyne interferometer, comprising:
   a radiation source adapted to provide a beam with a modulated amplitude;
   an amplitude modulator connected to the radiation source and configured to modulate the amplitude of the beam;
   a beam splitter adapted to split the amplitude-modulated beam into partial beams;
   interferometer arms, each of which receives at least one of the partial beams;
   an optical modulator adapted to change the frequency of radiation conducted via one of the interferometer arms; and
   a control device adapted to adjust the frequency change of the radiation;
   wherein the amplitude of the input beam is modulated using a frequency which is different from the frequency change of the radiation in the optical modulator.

* * * * *